United States Patent
Amin et al.

(10) Patent No.: US 8,819,481 B2
(45) Date of Patent: *Aug. 26, 2014

(54) MANAGING STORAGE PROVIDERS IN A CLUSTERED APPLIANCE ENVIRONMENT

(75) Inventors: Sandip Amin, Austin, TX (US); Ajay K. Bargoti, Bangalore (IN); Rishika Kedia, Bangalore (IN); Anbazhagan Mani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/448,034

(22) Filed: Apr. 16, 2012

(65) Prior Publication Data

US 2013/0007512 A1    Jan. 3, 2013

Related U.S. Application Data

(63) Continuation of application No. 13/173,503, filed on Jun. 30, 2011.

(51) Int. Cl.
*G06F 11/00* (2006.01)

(52) U.S. Cl.
USPC .................................. 714/6.21; 714/4.11

(58) Field of Classification Search
None
See application file for complete search history.

(56) References Cited

U.S. PATENT DOCUMENTS

| | | | |
|---|---|---|---|
| 7,624,170 B2 | 11/2009 | Das et al. | |
| 7,822,894 B2 | 10/2010 | Harima et al. | |
| 7,886,034 B1 | 2/2011 | Hartmann et al. | |
| 7,886,109 B2 | 2/2011 | Yamamoto et al. | |
| 7,945,773 B2 * | 5/2011 | Barabash et al. | 713/100 |
| 8,028,193 B2 * | 9/2011 | Dake et al. | 714/13 |
| 2007/0299951 A1 * | 12/2007 | Krithivas | 709/223 |
| 2009/0158081 A1 * | 6/2009 | Dake et al. | 714/3 |
| 2010/0125763 A1 | 5/2010 | Yamamoto et al. | |
| 2012/0297039 A1 * | 11/2012 | Acuna et al. | 709/223 |

OTHER PUBLICATIONS

Lock, T., "IBM Director: A Foundation for Systems Management," [online] The Sageza Group, Inc., Oct. 2006, [retrieved Apr. 26, 2011] retrieved from the Internet: <http://www.sageza.com/available/Snapshot/SoISN%2010-9-06%20IBM%20Director.pdf>.

Sims, D., et al., "Providing High Availability for IBM Director Server," [online] SteelEye Technology, Inc., [retrieved Apr. 26, 2011] retrieved from the Internet: <http://www.openminds.co.uk/upload/docs/IBM_Director_Brief.pdf>.

"Method and System for Simplifying Storage Management Environment Setup for IBM Systems Director," [online] IP.com, Aug. 11, 2010, [retrieved Apr. 26, 2011] retrieved from the Internet: <http://ip.com/IPCOM/000198635>.

* cited by examiner

*Primary Examiner* — Michael Maskulinski
(74) *Attorney, Agent, or Firm* — Cuenot, Forsythe & Kim, LLC

(57) ABSTRACT

Via a processor, receiving a power off alert indicating a power off condition of a first processing system on which a first storage provider is installed, the first storage provider managing at least one storage controller. The method further can include, responsive to the power off alert, issuing a first command to a second storage provider installed on a second processing system, the first command indicating to the second storage provider to assume management of the storage controller.

10 Claims, 4 Drawing Sheets

200

---

Receive a power off alert indicating a power off condition of a first processing system on which a first storage provider is installed, the first storage provider managing at least one storage controller
202

↓

Initiate a communication to a storage configuration manager to update a data structure to indicate that the first storage provider is inactive
204

↓

Query a storage configuration manager to receive an object identifier corresponding to a second processing system and mapping information identifying an address of the storage controller
206

↓

Communicate a first command to a second storage provider installed on the second processing system, the first command indicating to the second storage provider to assume management of the storage controller
208

↓

Receive a power on alert indicating a power on condition of the first processing system on which the first storage provider is installed
210

↓

Responsive to the power on alert, communicate a second command to the second storage provider installed on the second processing system, the second command indicating to the second storage provider to cease management of the storage controller
212

↓

Initiate a communication to the storage configuration manager to update a data structure to indicate that the first storage provider is active
214

| Receive a first storage provider inactive alert indicating a first storage provider installed on a first processing system is inactive, the first storage provider configured to manage at least one storage controller |
| --- |
| 302 |

↓

| Initiate a communication to a storage configuration manager to update a data structure to indicate that the first storage provider is inactive |
| --- |
| 304 |

↓

| Communicate a command to the first processing system to restart the first storage provider |
| --- |
| 306 |

↓

| Receive a second alert indicating whether the a first storage provider installed on the first processing system is active |
| --- |
| 308 |

↓

| Query a storage configuration manager to receive an object identifier corresponding to a second processing system and mapping information identifying an address of the storage controller |
| --- |
| 310 |

↓

| Communicate a command to a second storage provider installed on a second processing system, the command indicating to the second storage provider to assume management of the storage controller |
| --- |
| 312 |

↓

| Receive a storage provider active alert indicating the first storage provider installed on a first processing system is active |
| --- |
| 314 |

↓

| Communicate a second command to the second storage provider installed on the second processing system, the second command indicating to the second storage provider to cease management of the storage controller |
| --- |
| 316 |

↓

| Initiate a communication to the storage configuration manager to update a data structure to indicate that the first storage provider is active |
| --- |
| 318 |

FIG. 3

MANAGING STORAGE PROVIDERS IN A CLUSTERED APPLIANCE ENVIRONMENT

CROSS-REFERENCE TO RELATED APPLICATIONS

This application is a continuation of U.S. application Ser. No. 13/173,503, entitled MANAGING STORAGE PROVIDERS IN A CLUSTERED APPLIANCE ENVIRONMENT, and filed Jun. 30, 2011, the entirety of which is fully incorporated herein by reference.

BACKGROUND

One or more embodiments disclosed within this specification relate to storage providers. More particularly, one or more embodiments relate to managing storage providers in a clustered appliance environment.

Workload optimized systems (WoS) are computer systems that are optimized for specific kinds of workloads. In a WoS, servers, storage and network solutions are optimized to support a focused solution. In one type of WoS, management software can be provided to manage certain aspects of the WoS, such as servers, networks and storage subsystems. The management software can provide management personnel with a single point of control, thus helping to reduce IT management complexity and cost.

A storage subsystem typically includes a storage controller and one or more storage devices. A software component, known as an SMI-S provider and configured in accordance with the Storage Management Initiative Specification (SMI-S), can be implemented logically within the system hierarchy between the management software and one or more storage controllers. The SMI-S provider enables the management software to manage the storage controllers using a standard interface based on the Common Information Model (CIM) protocol. In this regard, the management software and the SMI-S provider can cooperatively manage the storage controllers. In a clustered appliance environment, a number of storage subsystems generally are used. Thus, many SMI-S providers may be used. In this regard, a plurality of servers may be provided to host the SMI-S providers; each of these servers typically executes an SMI-S provider instance.

BRIEF SUMMARY

One or more embodiments disclosed within this specification relate to storage providers. More particularly, one or more embodiments relate to managing storage providers in a clustered appliance environment.

An embodiment can include a method. The method can include, via a processor, receiving a power off alert indicating a power off condition of a first processing system on which a first storage provider is installed, the first storage provider managing at least one storage controller. The method further can include, responsive to the power off alert, issuing a first command to a second storage provider installed on a second processing system, the first command indicating to the second storage provider to assume management of the storage controller.

Another embodiment can include a method that includes, via a processor, receiving a storage provider inactive alert indicating a first storage provider installed on a first processing system is inactive, the first storage provider configured to manage at least one storage controller. The method further can include issuing a first command to a second storage provider installed on a second processing system, the first command indicating to the second storage provider to assume management of the storage controller.

Another embodiment can include a computer program product comprising a computer-readable storage medium having computer-readable program code embodied therewith, the computer-readable program code configured to perform the various steps and/or functions disclosed within this specification.

BRIEF DESCRIPTION OF THE SEVERAL VIEWS OF THE DRAWINGS

FIG. 2 is a flow chart illustrating a method of managing storage provider availability in a clustered appliance environment in accordance with another embodiment of the present invention.

FIG. 3 is a flow chart illustrating a method of managing storage provider availability in a clustered appliance environment in accordance with another embodiment of the present invention.

DETAILED DESCRIPTION

Figure 1:
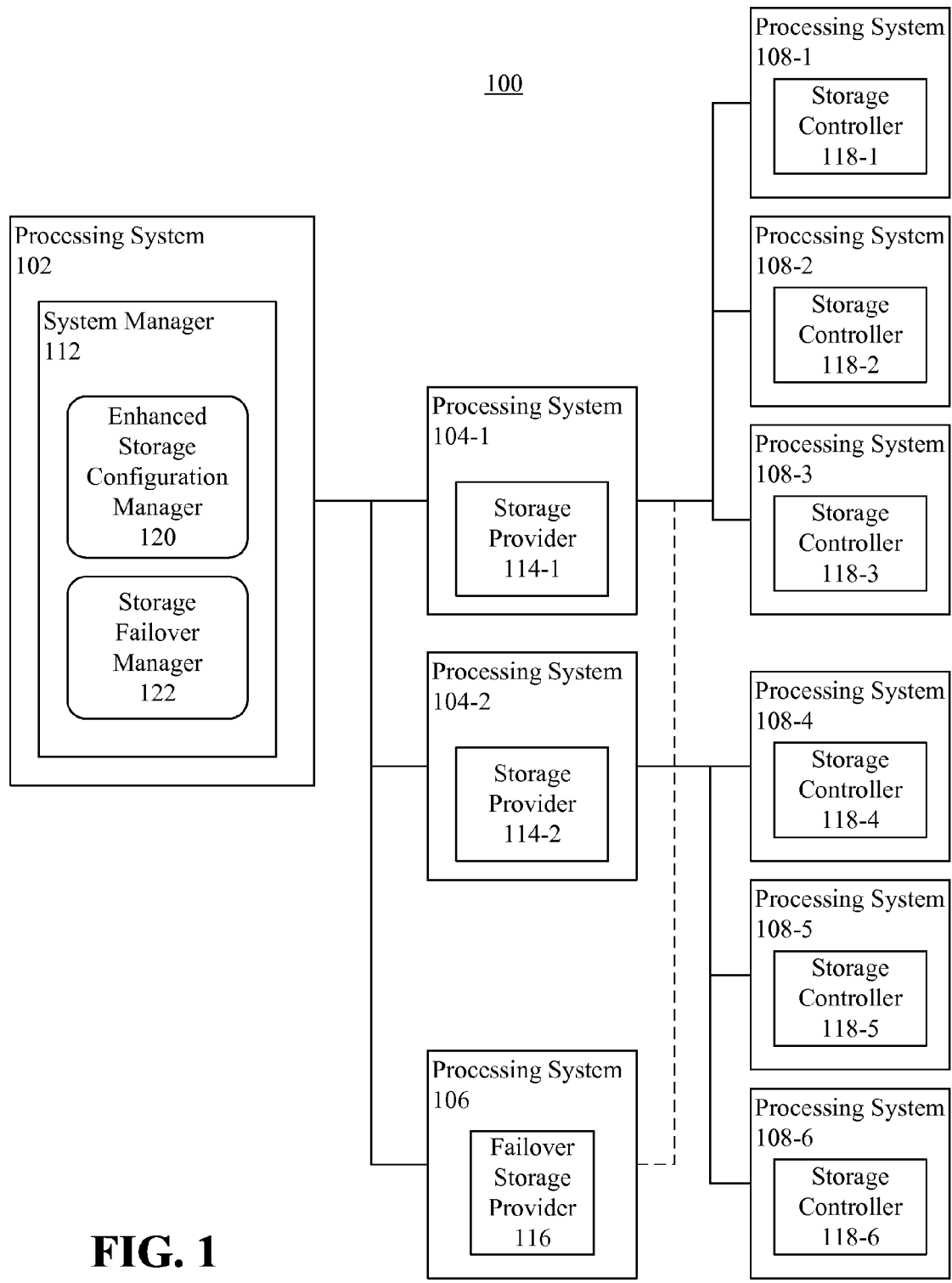
FIG. 1 is a block diagram illustrating a system for managing storage provider availability in a clustered appliance environment in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to a storage failover manager that monitors the status of processing systems (e.g., servers) and storage providers that manage storage subsystems. Based on runtime alert information, the storage failover manager can detect a failed storage provider and dynamically bring a failover storage provider online to take over management of storage subsystems managed by the storage provider that has failed. Further, the storage failover manager can configure the failover storage provider as appropriate to take over management of such storage subsystems.

FIG. 1 is a block diagram illustrating a system 100 for managing storage provider availability in a clustered appliance environment in accordance with one embodiment of the present invention. The system 100 can include a plurality of processing systems 102, 104, 106, 108. The processing systems 102, 104, 106, 108 can be computers (e.g., servers), application specific processing systems, or any other systems comprising at least one processor and memory.

A system manager 112 can be installed on the processing system 102, a storage provider 114 can be installed on each of the processing systems 104, and a failover storage provider 116 can be installed on the processing system 106. Additional processing systems 104 with respective storage providers 114, and additional processing systems 106 and failover storage providers 116, can be provided and the invention is not limited in regard. Moreover, the system 100 can include fewer processing systems 104 and storage providers 114 than depicted in the figure. For example, one processing system 104 and storage provider 114 can be provided.

A storage controller 118 can be installed in each of the processing systems 108. In one embodiment, one or more of the processing systems 108 may include a plurality of storage controllers 118. Each of the storage controllers 118 can control one or more storage devices (not shown), for example hard disk drives (HDDs), solid state drives (SSDs), or any other bulk storage devices.

The system manager 112 can be communicatively linked to the storage providers 114 and the failover storage provider 116 via the respective processing systems 102, 104 and a network, such as a local area network (LAN) or a system bus. Similarly, the storage providers 114 and the failover storage provider 116 can be communicatively linked to the storage controllers 118 via the respective processing systems 104, 106, 108 and a network, such as a local area network (LAN) or a system bus. Nonetheless, communication links between the various components of the system 100 can be formed in any suitable manner, and the invention is not limited in this regard.

The system manager 112 can be management software that manages certain aspects of a workload optimized system (WoS), including management of the storage controllers 118. In one embodiment, the system manager 112 can be implemented as an IBM® Systems Director, though the invention is not limited in this regard.

In one embodiment, the storage providers 114 can be SMI-S providers configured in accordance with the Storage Management Initiative Specification (SMI-S). In this regard, the storage providers 114 can enable the system manager 112 to manage the storage controllers 118 using a standard interface based on the Common Information Model (CIM) protocol. In this regard, the storage providers 114 can be implemented logically within the hierarchy of the system 100 between the system manager 112 and the storage controllers 118. Further, each storage provider 114 can be used by the system manager 112 to manage one or more storage controllers 118.

By way of example, in an initial configuration, each storage provider 114 can provide an interface between the system manager 112 and one or more storage controllers 118. For example, the storage provider 114-1 can be configured to provide an interface between the system manager 112 and the storage controllers 118-1, 118-2, 118-3, and the storage provider 114-2 can be configured to provide an interface between the system manager 112 and the storage controllers 118-4, 118-5, 118-6. In this regard, the system manager 112 and storage provider 114-1 can cooperatively manage the storage controllers 118-1, 118-2, 118-3, and the system manager 112 and storage provider 114-2 can cooperatively manage the storage controllers 118-4, 118-5, 118-6.

The system manager 112 can include an enhanced storage configuration manager (ESCM) 120, which can configure the storage controllers 118 to map the storage controllers 118 to the respective storage providers 114. In other words, the ESCM 120 can assign each of the storage controllers 118 to a particular storage provider 114. In this regard, the ESCM 120 can maintain various data relating to the mapping of the storage providers 114 and storage controllers 118, storage provider status, failover storage providers, etc. Such data can be maintained in an ESCM data table or similar data structure. Table 1 is an example of such an ESCM data table.

TABLE 1

| Storage Controller IP Address | IP Address of Storage Provider | Storage Provider Status | IP Address of Failover Storage Provider | Active OID of Storage Provider |
|---|---|---|---|---|
| {[10.1.2.60, 10.1.2.61], [10.1.2.62, 10.1.2.63], [10.1.2.64, 10.1.2.65]} | 10.1.2.100 | Active | 10.1.2.300 | 0xFFDCE1 |
| {[10.1.2.50, 10.1.2.51], [10.1.2.52, 10.1.2.53], [10.1.2.54, 10.1.2.56]} | 10.1.2.101 | Active | 10.1.2.300 | 0xFDPQR7 |
| {[10.1.2.40, 10.1.2.41], [10.1.2.42, 10.1.2.43], [10.1.2.44, 10.1.2.46]} | 10.1.2.103 | Active | 10.12.300 | 0xFCDPR3 |

The ESCM data table can include a one or more records for each storage provider 114. Each record can include a field for mapping information, such as IP addresses, corresponding to storage controllers 118 assigned to a particular storage provider 114. For example, if the record pertains to the storage provider 114-1, the record can indicate the IP addresses for the storage controllers 118-1, 108-2 and 108-3. Each storage controller 118, or the processing systems 108 in which the storage controllers 118 are installed, can include more than one network port. Accordingly, mapping information can be provided for each of the network ports on each of the storage controllers 118.

Each record also can include a field for mapping information corresponding to the storage provider 114 and a field that indicates the storage provider's status (e.g., active or inactive). For example, such mapping information can be the IP address of the processing system 104 on which the storage provider 114 is installed. Each record further can include a field that indicates mapping information corresponding to a failover storage provider 116 that may be brought online to take over the functionality of the storage provider 114 if the storage provider 114 fails. The failover storage provider's mapping information can be an IP address of a processing system 106 on which the failover storage provider 116 is installed. In addition, each record can include an active object identifier (OID) of the processing system 104 on which the storage provider 114 is installed.

The system manager 112 further can include a storage failover manager (SFM) 122 which handles bringing the failover storage provider 116 online to replace a storage provider 114 that goes offline, and taking the failover storage provider 116 offline when a storage provider 114 comes back online. The SFM 122 can register an event action plan (EAP) for each of the storage providers 114. The SFM 122 can trigger EAP based on a filtered set of alerts. Examples of such alerts include, but are not limited to, alerts indicating power on or off of a processing system 104 or 106, alerts indicating a storage provider 114 or the failover storage provider 116 becoming active, and alerts indicating a storage provider 114 or the failover storage provider 116 becoming inactive.

On power off (e.g., an intended power off or crash) of a processing system 104 is detected, such as the processing system 104-1, a power off alert can be generated for the processing system indicating the power off condition. The power off alert can be generated by the storage provider 114-1 or the processing system's operating system. The power off alert can be communicated to the SFM 122 and identify the storage provider 114-1. In response to the power off alert, the SFM 122 can implement a corresponding EAP for the storage provider 114-1. The EAP can trigger the SFM 122 to query the ESCM 120 to retrieve from the ESCM data table the mapping information (e.g., IP address) of the failover storage provider 116 (e.g., the IP address of the processing system 106) identified in the record of the ESCM data table corresponding to the storage provider 114-1. The SFM 122 further can communicate a command to the processing system 106 to activate the failover storage provider 116 if the failover storage provider 116 is not already activated. The SFM 122 also can communicate to the failover storage provider 116 a command to add mapping information of the storage controllers 118-1, 118-2, 118-3, associated with the storage provider 114-1. For example, for each of the storage controllers, 118-1, 118-2, 118-3, the SFM 122 can communicate the following command to the failover storage provider 116 to transfer management of the storage controllers 118-1, 118-2, 118-3 to the failover storage provider 116, thereby transferring management of the storage controllers 118-1, 118-2, 118-3 to the failover storage provider 116:

Smcli-escm-a<controller IP><host OID>

The controller IP can indicate the IP address of a storage controller 118, which in this example is the storage controllers mapping information. The host OID can be the object identifier of the processing system 106.

In response to the command, the failover storage provider 116 can add mapping information of the storage controllers 118-1, 118-2, 118-3 to the failover storage provider's storage controller management list, and cooperate with the ESCM 120 to assume management of the storage controllers 118-1, 118-2, 118-3. Further, the SFM 122 can initiate a communication to the ESCM 120 to update the ESCM data table to indicate that the storage provider 114-1 is inactive.

When power on of a processing system 104 is detected, for example the processing system 104-1, a power on alert can be generated for the processing system indicating the power on condition. The power on alert can be generated by the storage provider 114-1 or the processing system's operating system. The power on alert can be communicated to the SFM 122 and identify the storage provider 114-1. In response to the power on alert, the SFM 122 can implement a corresponding EAP for the storage provider 114-1. The EAP can trigger the SFM 122 to query the ESCM 120 to retrieve from the ESCM data table the mapping information (e.g., IP addresses) of the storage controllers 118-1, 118-2, 118-3 associated with the storage provider 114-1. The SFM 122 also can communicate to the failover storage provider 116 a command to remove mapping information of the storage controllers 118-1, 118-2, 118-3. For example, for each of the storage controllers, 118-1, 118-2, 118-3, the SFM 122 can communicate the following command to the failover storage provider 116 to cease management of the storage controllers 118-1, 118-2, 118-3 by the failover storage provider 116:

Smcli-escm-r<controller IP><host OID>

In response to the command, the failover storage provider 116 can remove mapping information of the storage controllers 118-1, 118-2, 118-3 from the failover storage provider's storage controller management list, thereby allowing the storage provider 114-1 to cooperate with the ESCM 120 to assume management of the storage controllers 118-1, 118-2, 118-3. Further, the SFM 122 can initiate a communication to the ESCM 120 to update the ESCM data table to indicate that the storage provider 114-1 is active.

A storage provider inactive alert can be generated for the storage provider 114-1, or the operating system of the processing system 104-1, when the storage provider 114-1 becomes inactive, for example when the storage provider 114-1 freezes or crashes during operation. The storage provider inactive alert also can be generated if the storage provider 114-1 does not start after the start of the operating system. The storage provider inactive alert can be communicated to the SFM 122 which, in response, can implement a corresponding EAP for the inactive storage provider 114-1. The EAP can trigger the SFM 122 to initiate a communication to the ESCM 120 to update the ESCM data table to indicate that the storage provider 114-1 is inactive. In addition, the EAP can trigger the SFM 122 to communicate a command to the processing system on which the storage provider 114-1 is installed to restart the storage provider 114-1. If the storage provider 114-1 is successfully restarted, then the storage provider 114-1, or the operating system of the processing system 104-1, can generate a storage provider active alert and communicate the storage provider active alert to the SFM 122.

If the storage provider 114-1 fails to start, then another storage provider inactive alert can be generated and communicated from storage provider 114-1, or the operating system of the processing system 104-1, to the SFM 122. In response, the SFM 122 can communicate with the ESCM 120 to identify the failover storage provider 116 from a record corresponding to the storage provider 114-1 in the record of the ESCM data table corresponding to the storage provider 114-1. The SFM 122 then can communicate a command to the processing system 106 to activate the failover storage provider 116 if the failover storage provider 116 is not already activated. The SFM 122 also can communicate to the failover storage provider 116 a command to add mapping information of the storage controllers 118-1, 118-2, 118-3 associated with the storage provider 114-1. For example, for each of the storage controllers, 118-1, 118-2, 118-3, the SFM 122 can communicate the following command to the failover storage provider 116 to add management of the storage controllers 118-1, 118-2, 118-3 to the failover storage provider 116, thereby transferring management of the storage controllers 118-1, 118-2, 118-3 to the failover storage provider 116:

Smcli-escm-a<controller IP><host OID>

In response to the message, the failover storage provider 116 can add mapping information of the storage controllers 118-1, 118-2, 118-3 to the failover storage provider's storage controller management list, and cooperate with the ESCM 120 to assume management of the storage controllers 118-1, 118-2, 118-3. Further, the SFM 122 can initiate a communication to the ESCM 120 to update the ESCM data table to indicate that the storage provider 114-1 is inactive.

When the storage provider 114-1 again becomes active, a storage provider active alert can be generated for the storage provider 114-1, or the operating system of the processing system 104-1. The storage provider active alert can be communicated to the SFM 122 which, in response, can implement a corresponding EAP for the active storage provider 114-1. The EAP can trigger the SFM 122 to initiate a communication to the ESCM 120 to update the ESCM data table to indicate that the storage provider 114-1 is active. The SFM 122 also can communicate to the failover storage provider 116 a command to remove mapping information of the storage controllers 118-1, 118-2, 118-3. For example, for each of the storage controllers, 118-1, 118-2, 118-3, the SFM 122 can communicate the following command to the failover storage provider 116 to cease management of the storage controllers 118-1, 118-2, 118-3 by the failover storage provider 116:

Smcli-escm-r<controller IP><host OID>

Further, when new storage controllers 118 are brought on line, and such storage controllers are not allocated to an existing storage provider 114, such storage controllers 118 can be added to the failover storage provider's storage controller management list to allow the failover storage provider 116 to cooperate with the ESCM 120 to manage such newly added storage controllers 118. In illustration, each storage provider 114 can have a maximum capacity with respect to the number of storage controllers 118 that can be managed by the storage providers 114. When the addition of new storage controllers 118 in the system 100 causes the total number of storage controllers 118 that can be managed by the storage providers 114 to exceed a threshold value, the newly added storage controllers 118 can be allocated to the failover storage provider 116. For example, for each of the new storage controllers 118, the SFM 122 can communicate the following command to the failover storage provider 116 to add management of the storage controllers to the failover storage provider 116:

Smcli-escm-a<controller IP><host OID>

In another embodiment, management of one or more storage controllers 118 can be transferred from the storage provider 114-1 to the storage provider 114-2. For example, the following command can be communicated to the storage provider 114-1 to cease management of the storage controller(s) from the storage provider 114-1:

Smcli-escm-r<controller IP><host OID>

Further, the following command can be communicated to the storage provider 114-2 to add management of the storage controller(s) from the storage provider 114-1:

Smcli-escm-a<controller IP><host OID>

In both commands, the controller IP can be the IP address of the controller to be transferred. In the former command, the host OID can be the OID of the processing system 104-1. In the latter command, the host OID can be the OID of the processing system 104-2. Accordingly, the load balance of the storage providers 114 with respect to managing storage controllers 118 can be adjusted. The transfer of one or more storage controllers 118 from one storage provider 114-1 to another storage provider 114-2 can be initiated in response to any desired events or conditions, for example upon detecting a particular storage provider 114-1 is more heavily loaded than another storage provider 114-2.

FIG. 2 is a flow chart illustrating a method 200 of managing storage provider availability in a clustered appliance environment in accordance with another embodiment of the present invention. At step 202, a power off alert can be received. The power off alert can indicate a power off condition of a first processing system on which a first storage provider is installed, the first storage provider managing at least one storage controller. Responsive to the power off alert, a number of steps can be initiated in accordance with an EAP corresponding to the first storage provider.

In illustration, at step 204, a communication can be initiated to a storage configuration manager to update a data structure to indicate that the first storage provider is inactive. At step 206, a storage configuration manager can be queried to receive an object identifier corresponding to a second processing system and mapping information identifying an address of the storage controller. At step 208, a first command can be communicated to a second storage provider installed on the second processing system, the first command indicating to the second storage provider to assume management of the storage controller. In this regard, management of the storage controller can be transferred from the first storage provider to the second storage provider. In one embodiment, the second storage controller can be a failover storage controller.

At step 210 a power on alert can be received indicating a power on condition of the first processing system on which the first storage provider is installed. Responsive to the power on alert, at step 212 a second command can be communicated to the second storage provider installed on the second processing system, the second command indicating to the second storage provider to cease management of the storage controller. At step 214, a communication to the storage configuration manager can be initiated to update a data structure to indicate that the first storage provider is active. Accordingly, when the first processing system is back online, management of the storage controller can be transferred back to the first storage provider.

FIG. 3 is a flow chart illustrating a method 300 of managing storage provider availability in a clustered appliance environment in accordance with another embodiment of the present invention. At step 302, a first storage provider can receive an inactive alert indicating a first storage provider installed on a first processing system is inactive, the first storage provider configured to manage at least one storage controller. Responsive to the power off alert, a number of steps can be initiated in accordance with an EAP corresponding to the first storage provider.

In illustration, at step 304, a communication can be initiated to a storage configuration manager to update a data structure to indicate that the first storage provider is inactive. At step 306, a command can be communicated to the first processing system to restart the first storage provider. At step 308, a second alert can be received indicating whether the first storage provider installed on a first processing system is active. If alert is a storage provider active alert, the process can proceed to step 318 and a communication can be initiated to a storage configuration manager to update a data structure to indicate that the first storage provider is active. The process can end until another alert is received.

If the second alert is a storage provider inactive alert indicating that the storage provider still is inactive, at step 310 a storage configuration manager can be queried to receive an object identifier corresponding to a second processing system and mapping information identifying an address of the storage controller. At step 312, a command can be communicated to a second storage provider installed on a second processing system, the command indicating to the second storage provider to assume management of the storage controller. In this regard, management of the storage controller can be transferred from the first storage provider to the second storage provider. In one embodiment, the second storage controller can be a failover storage controller.

At step 314, a storage provider active alert can be received indicating the first storage provider installed on a first processing system is active. At step 316, a second command can be communicated to the second storage provider installed on the second processing system, the second command indicating to the second storage provider to cease management of the storage controller. At step 318, a communication to the storage configuration manager can be initiated to update a data structure to indicate that the first storage provider is active. Accordingly, when the first storage provider is again active, management of the storage controller can be transferred back to the first storage provider.

Figure 4:
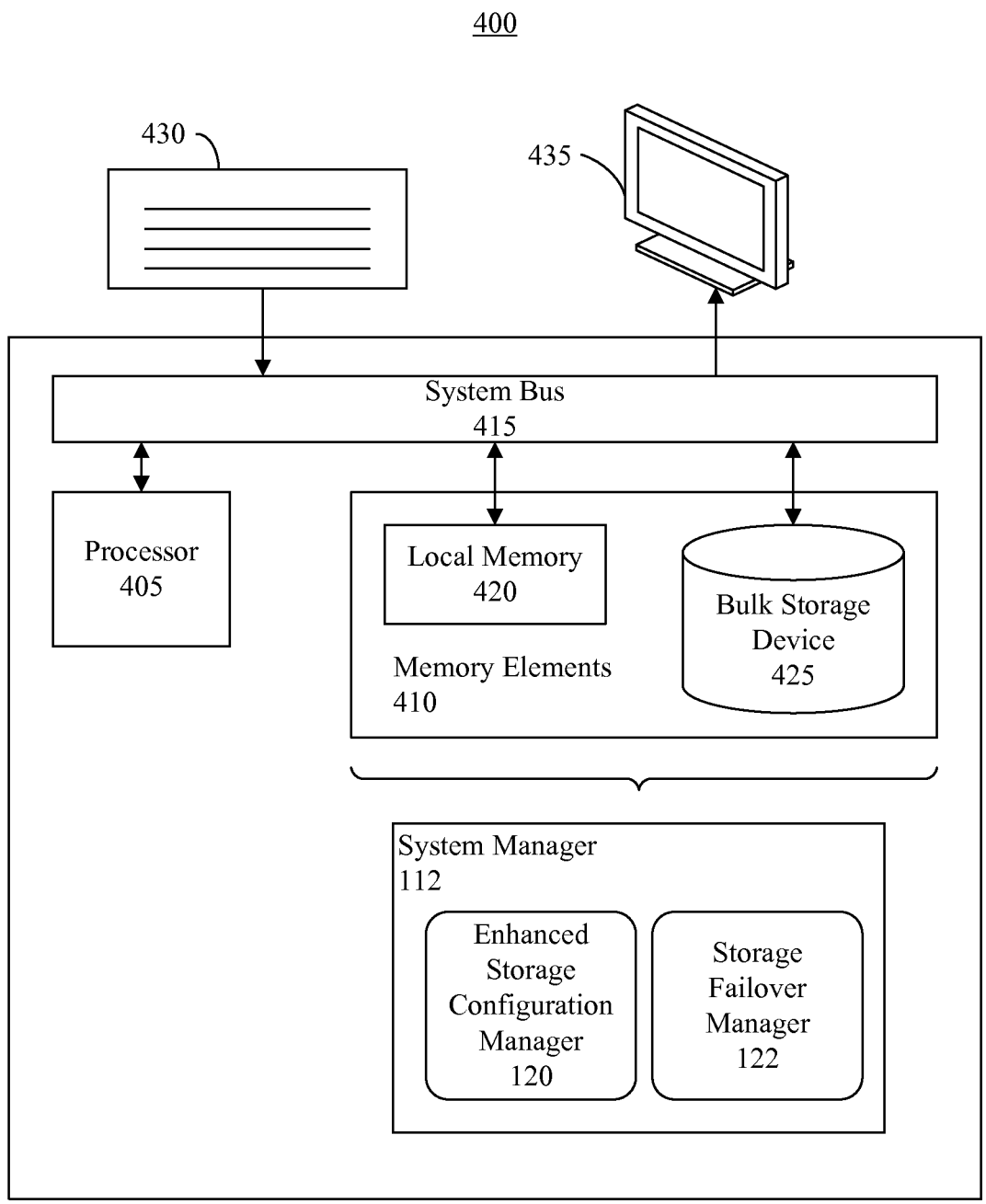
FIG. 4 is a processing system for managing storage provider availability in a clustered appliance environment in accordance with another embodiment of the present invention.

FIG. 4 is a block diagram of a processing system (hereinafter "system") 400 for managing storage provider availability in a clustered appliance environment in accordance with another embodiment of the present invention. The system 400 can include at least one processor 405 coupled to memory elements 410 through a system bus 415. As such, the system 400 can store program code within the memory elements 410. The processor 405 can execute the program code accessed from the memory elements 410 via the system bus 415. In one aspect, for example, the system 400 can be implemented as computer that is suitable for storing and/or executing program code. It should be appreciated, however, that the system 400 can be implemented in the form of any system comprising a processor and memory that is capable of performing the functions described within this specification.

The memory elements 410 can include one or more physical memory devices such as, for example, local memory 422 and one or more bulk storage devices 425. Local memory 422 refers to random access memory or other non-persistent memory device(s) generally used during actual execution of the program code. Bulk storage device(s) 425 can be implemented as a hard disk drive (HDD), solid state drive (SSD) or other persistent data storage device. The system 400 also can include one or more cache memories (not shown) that provide temporary storage of at least some program code in order to reduce the number of times program code must be retrieved from bulk storage device 425 during execution.

Input/output (I/O) devices such as a keyboard 430, a display 435, and a pointing device (not shown) optionally can be coupled to the system 400. The I/O devices can be coupled to the system 400 either directly or through intervening I/O controllers. Network adapters also can be coupled to the system 400 to enable the system 400 to become coupled to other systems, computer systems, remote printers, and/or remote storage devices through intervening private or public networks. Modems, cable modems, and Ethernet cards are examples of different types of network adapters that can be used with the system 400.

As pictured in FIG. 4, the memory elements 410 can store the system manager 112, including the ESCM 120 and the SFM 122. The processor can execute the system manager 112 to implement the processes and methods described herein.

Like numbers have be used to refer to the same items throughout this specification. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
via a processor, receiving a power off alert indicating a power off condition of a first processing system on which a first storage provider is installed, the first storage provider managing at least one storage controller;
responsive to the power off alert, issuing a first command to a second storage provider installed on a second processing system, the first command indicating to the second storage provider to assume management of the storage controller;
receiving a power on alert indicating a power on condition of the first processing system on which the first storage provider is installed; and
responsive to the power on alert, issuing a second command to the second storage provider installed on the second processing system, the second command indicating to the second storage provider to cease management of the storage controller.

2. The method of claim 1, further comprising:
querying a storage configuration manager to receive an object identifier corresponding to the second processing system;
wherein the first command is directed to the object identifier.

3. The method of claim 1, further comprising:
querying a storage configuration manager to receive mapping information identifying an address of the storage controller;
wherein the first command identifies the address of the storage controller.

4. The method of claim 1, further comprising:
issuing a second command to the second processing system to activate the second storage provider.

5. The method of claim 1, further comprising:
initiating a communication to a storage configuration manager to update a data structure to indicate that the first storage provider is inactive.

6. A method comprising:
via a processor, receiving a storage provider inactive alert indicating a first storage provider installed on a first processing system is inactive, the first storage provider configured to manage at least one storage controller;
issuing a first command to a second storage provider installed on a second processing system, the first command indicating to the second storage provider to assume management of the storage controller;
receiving a storage provider active alert indicating the first storage provider installed on the first processing system is active; and
issuing a second command to the second storage provider installed on the second processing system, the second command indicating to the second storage provider to cease management of the storage controller.

7. The method of claim 6, further comprising:
initiating a communication to a storage configuration manager to update a data structure to indicate that the first storage provider is inactive.

8. The method of claim 6, further comprising:
querying a storage configuration manager to receive an object identifier corresponding to the second processing system;
wherein the first command is directed to the object identifier.

9. The method of claim 6, further comprising:
querying a storage configuration manager to receive mapping information identifying an address of the storage controller;
wherein the first command identifies the address of the storage controller.

10. A method comprising:
via a processor, receiving a first storage provider inactive alert indicating a first storage provider installed on a first processing system is inactive, the first storage provider configured to manage at least one storage controller;
responsive to receiving the first storage provider inactive alert, issuing a first command to the first processing system to restart the first storage provider;
receiving a storage provider active alert or a second storage provider inactive alert indicating whether the first storage provider is successfully restarted; and
responsive to receiving the second storage provider inactive alert, issuing a second command to a second storage provider installed on a second processing system, the second command indicating to the second storage provider to assume management of the storage controller.

* * * * *